United States Patent
Gove, Jr.

(10) Patent No.: US 12,289,324 B1
(45) Date of Patent: Apr. 29, 2025

(54) INCIDENT REPORT SUMMARY AND VISUALIZATION

(71) Applicant: Two Six Labs, LLC, Arlington, VA (US)

(72) Inventor: Robert P. Gove, Jr., Reston, VA (US)

(73) Assignee: Two Six Labs, LLC, Arlington, VA (US)

( * ) Notice: Subject to any disclaimer, the term of this patent is extended or adjusted under 35 U.S.C. 154(b) by 470 days.

(21) Appl. No.: 17/410,317

(22) Filed: Aug. 24, 2021

(51) Int. Cl.
| | |
|---|---|
| *H04L 9/40* | (2022.01) |
| *G06N 5/025* | (2023.01) |
| *G06N 5/04* | (2023.01) |
| *G06Q 10/20* | (2023.01) |

(52) U.S. Cl.
CPC ......... *H04L 63/1416* (2013.01); *G06N 5/025* (2013.01); *G06N 5/04* (2013.01); *G06Q 10/20* (2013.01)

(58) Field of Classification Search
CPC ...... H04L 63/1416; G06N 5/025; G06N 5/04; G06Q 10/20
See application file for complete search history.

(56) References Cited

U.S. PATENT DOCUMENTS

| | | | | |
|---|---|---|---|---|
| 2008/0229419 | A1* | 9/2008 | Holostov | G06F 21/564 726/24 |
| 2008/0255754 | A1* | 10/2008 | Pinto | G01C 21/3691 701/119 |
| 2016/0021141 | A1* | 1/2016 | Liu | H04L 63/1483 726/23 |
| 2019/0149396 | A1* | 5/2019 | Zafer | H04L 41/0654 709/224 |
| 2020/0004877 | A1* | 1/2020 | Ghafourifar | G06F 16/35 |
| 2020/0374179 | A1* | 11/2020 | Arrabolu | H04L 41/0631 |
| 2021/0192057 | A1* | 6/2021 | Helfman | G06F 21/577 |
| 2021/0352095 | A1* | 11/2021 | Cam | G06N 7/01 |

* cited by examiner

*Primary Examiner* — Abu S Sholeman
(74) *Attorney, Agent, or Firm* — Armis IP Law, LLC (57) ABSTRACT

A network incident summarization and visualization tool presents a summarized or filtered rendering of an analysis or narrative of a collection of events gathered from a stream of incident reports. A graph structure stores entities and relationships between network entities in a graph form based on temporal correspondence between different incidents. An evaluation of the entities and the relationships implements a scoring methodology that identifies the most significant incidents based on the entities and component groups of entities associated by a sequence of relationships. The scoring methodology provides a normalized score that is filtered based on a threshold that removes entities having little to no correspondence or effect. The resulting filtered rendering defines a graph of entities and relationships ordered by type and significance such that the most important aspects of the rendered narrative are apparent.

16 Claims, 9 Drawing Sheets

INCIDENT REPORT SUMMARY AND VISUALIZATION

STATEMENT REGARDING FEDERALLY SPONSORED RESEARCH AND DEVELOPMENT

This invention was made, at least in part, with government support under Contract No. W912CG20C0001. The Government has certain rights in the invention.

BACKGROUND

Information processing systems for server, network monitors and the like typically generate events, or incident reports, to document and trigger remedial or corrective actions to any anomalies that may appear. Cyber security logs often receive particular scrutiny. While an event often strives to include relevant information about the particular anomaly, analysis and detection of significant occurrences may require observation of multiple events in context to assess the situation. The context of such cyber security logs and incident reports describe a narrative, but in practice analysts view the data in tables where it can be difficult to follow the narrative. Narrative visualizations have proven useful, but common examples use an abbreviated narrative to attempt to demonstrate or visualize the full narrative defined by the events.

SUMMARY

A network incident summarization and visualization tool presents a summarized or filtered rendering of an analysis or narrative of a collection of events gathered from incident reports. A graph structure stores entities and relationships between network entities in a graph form based on temporal correspondence between different incidents. An evaluation of the entities and the relationships implements a scoring methodology that identifies the most significant incidents based on the entities and component groups of entities associated by a sequence of relationships. The scoring methodology provides a normalized score that is filtered based on a threshold that removes entities having little to no correspondence or effect. The resulting filtered rendering defines a graph of entities and relationships ordered by type and significance such that the most important aspects of the rendered narrative are apparent.

Analysts often document and share cyber security incidents in the form of incident reports, which contain a narrative of the incident. Some cyber security incidents are relatively easy to understand because they are short and small in scope. However, larger scale incidents may span months and involve excessive entities for an analyst to easily comprehend the key elements of the incident. Even an incident report describing a week-long event can contain several dozen entities and hundreds of relationships, which can make it difficult for analysts to quickly identify the key entities and events. It would be beneficial to generate easily consumable summaries of long or complicated logs, incident reports, and related types of cyber narratives.

An "incident report" as defined herein could be any set of recorded or grouped events or occurrences that are deemed share some nexus to a common thread, cause or entity reported on. The examples herein illustrate the claimed approach in the context of cybersecurity logs and incident reports for the purpose of generating concise visualizations by focusing on and designating the most significant reported facts arising from the analyzed events.

If the incident reports were purely in natural language, one could use text summarization techniques to reduce their size, thereby focusing analyst attention on key entities and relationships. However, incident reports often comprise structured data or extracts from system logs that are not amenable to traditional automatic text summarization techniques. This motivates the need to summarize these data to highlight the primary entities, events, and relationships. A narrative summary as disclosed herein helps to orient analysts to the relationships between the main victims and attackers, and then quickly triage incident reports, or provide an easily consumable overview to brief organization leaders or the public.

In a particular configuration discussed further below, for a plurality of incident reports containing events occurring in a networked environment, a method of computing and reporting the most significant events includes determining a set of entities, and a set of relationships between the entities from the incident reports, such that each relationship in the set of relationships is formed between a pair of the entities in the set of entities. Such network entities include any viable network object, such as IP addresses, servers, hosts, users and the like, which may be associated with an incident or event. The method identifies, based on the entities and relationships, components including a group of the entities connected by one or more relationships. A visualization and rendering server evaluates the entities and components based on a temporal congruity of the relationships for computing a significance of the entities relative to the other entities, such that the evaluation of a component augments the computed significance of the entities included in the component. Temporal analysis associates entities based on incidents that occur in the same or similar timeframe. The server then renders, based on an importance threshold, an indication of the entities having the greatest computed significance, and discards those entities that do not meet the importance threshold.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In the discussion that follows, an example of a visualization and rendering server executes the network incident summarization and visualization tool for receiving the stream of incidents and rendering a filtered report based on a full analysis of entities and relationships reported in the incident stream. Graph processing techniques receive the incident stream and form a graph structure based on relationships between the entities. The graph is traversed and a set of scoring rules applied to generate a quantitative significance score. Filtering removes lower scoring entities so that the most significant entities remain.

Figure 1A:
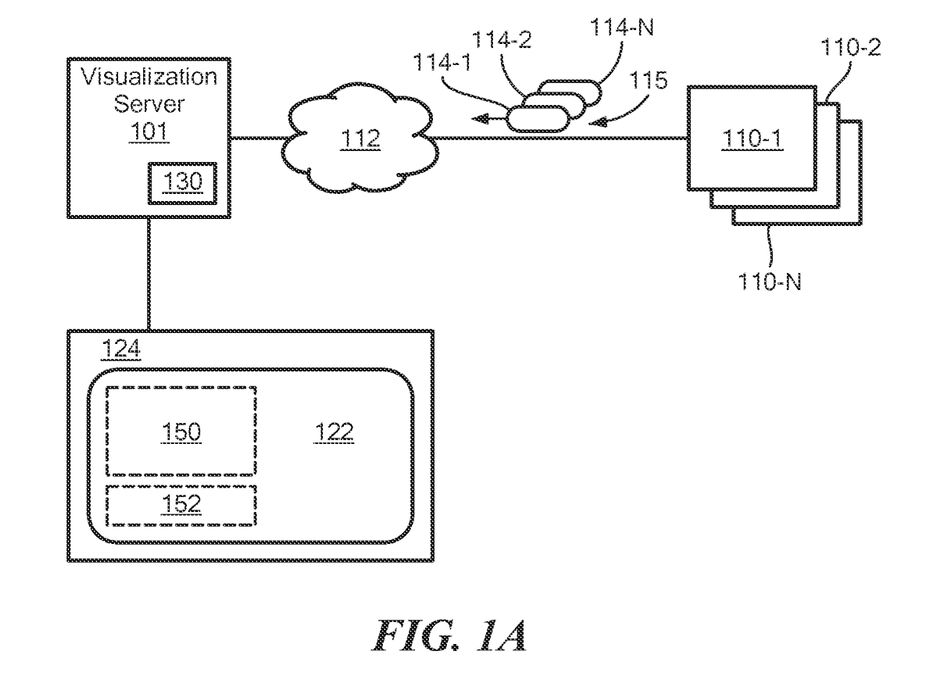
FIG. 1A is a context diagram of a network environment suitable for use with configurations herein.

FIG. 1A is a context diagram of a network environment suitable for use with configurations herein. Referring to FIG. 1A, in an information processing environment 100, various network fixtures 110-1 . . . 110-N (110 generally), such as computing devices and nodes, transmit incident reports 115, each including one or more incident elements 114-1 . . . 114-N (114 generally) via a network 112 to the visualization and rendering server 101 (server). The server 101 computes a narrative report 150 and summary report 152 and renders the report on a screen 122 of an output device 124.

The example shown allows for multiple incident reports, each including multiple incident elements. The incident elements define events, actions or occurrences deemed relevant to a particular result or outcome. The incident report purports to describe an "incident," and typically refers to a higher level set of events, entities, and relationships, Generally, an incident report is a single document that describes an entire incident or as much as currently is known. The incident elements 114 are generally discrete facts or events about the incident defining at least an entity and a time.

The server 101 is invoked for generating a so-called "storyline," a type of visualization for analyzing entity timelines and relationships between entities. The design of storylines have been based on media works such as movies and literature works for tracking events, timing and relations between characters. In contrast, the incident reports are a type of document or message that describe potentially harmful events that could affect the confidentiality, integrity, or availability of a system or device in the information processing network. Incident reports often include semi-structured or structured data from system or network logs that document what was affected, when it was affected, and where and how the incident originated. Because incident reports contain these tables of data, configurations herein transform the data into a format suitable for input into a visualization and summarization tool 130 or application launched on the server 101.

Figure 1B:
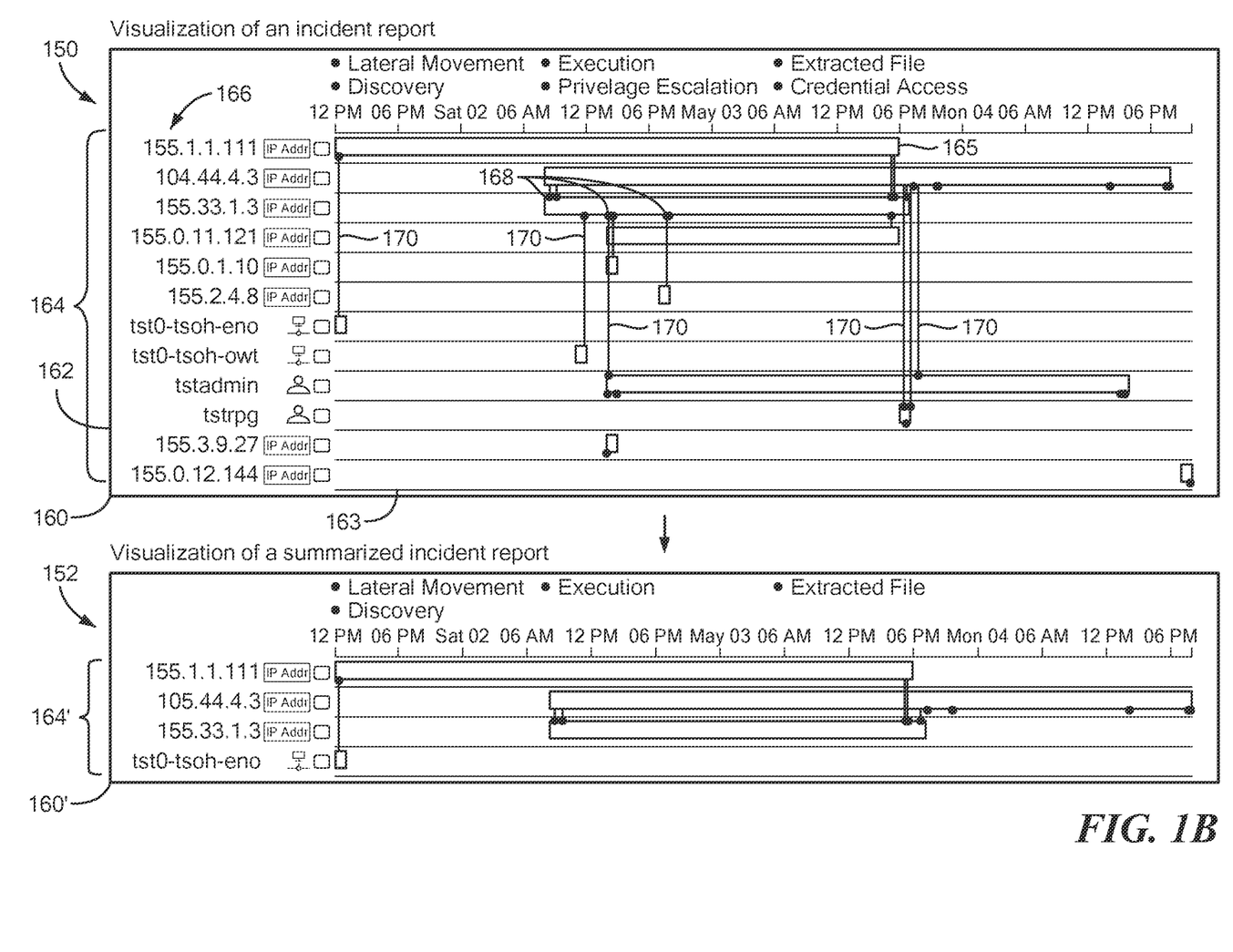
FIG. 1B is an example of the narrative report and resulting summary report.

FIG. 1B is an example of the narrative report 150 and resulting summary report 152, which includes a subset of the entities of the narrative report filtered for significance. In generating the report 150, the server 101 receives the incident report 115 of incident elements 114-N gathered from one or more processes on the network fixtures 110-N for gathering network security events. Each incident element 114 defines an entity and a timestamp, in addition to any other relational or field data descriptive of the incident. Reporting logic arranges the incident report 115 as a rendering 160 defined by an entity axis 162 including an entry for each entity and a time axis 163 indicating a commencement and a duration of activity corresponding to each respective entity 166. Relationships are rendered as a connector 170 between the entities defined by the respective relationship. The server 101 renders a report 160' showing a filtered set based on a subset of the entries 164' having the greatest computed significance.

For visualization and summarization purposes of the rendering 150 (report), the data generally includes: entities 166, which are the subjects and objects of narratives, such as IP addresses, hosts, and user accounts; and relationships, shown by connectors 170, that describe associations between entities, such as a user logging into a host. Relationships are typically directed, where the source is acting on the target. The relationship type can be used to further describe the relationship, for example to indicate a tactic, technique, or procedure (TTP) from an external or established reference such as the MITRE ATT&CK Framework, discussed further below. The framework results from an attempt to normalize and rank severity of likely cyberattack mediums. This framework is a matrix with 14 columns (one column for each tactic). The columns are ordered so that tactics that occur in later stages of an attack are farther to the right, thus giving an order of severity.

Timestamps are applied to entities and relationships to denote when entities and relationships are observed in the data. This information forms a temporal entity relationship graph, where the entities 166 are the vertices and the relationships are the edges. The timestamps and relationship types provide additional data for visualization such as in FIG. 1B.

In FIG. 1B, the server 101 renders, for each incident element 114, an indication of the type of incident and an indication of the time of the incident on the entry 164 corresponding to the entity 166 to which the incident pertains. Each entry 164-1 . . . 164-N (164 generally) includes a bar 165 spanning the duration with which the entity 166 was active. An indicator dot 168 (tag, tick mark, etc) marks the time of either an event or the source of a relationship, and may be color coded, shaded, subscripted etc. to denote the event or relationship type. The connector 170 extends from the indicator dot 168 of an incident of an entity, to the bar 165 for the entity 166 to which the relationship pertains, thus forming an edge in the graph.

The aggregate visualization shown in FIG. 1B is derived from multiple incident elements 114, often contained in a single incident report 115. Each incident element references at least an entity 166 and a timestamp 167, and optionally other information for defining associations. The associations are often defined between entities and based on temporal (time) agreement of activity, but may be based on any suitable criteria that relates the entries 164 rendered in the report. The visualization it most illuminating when showing network cyber security data, but the summarization process can be applied to many different types of data that exhibit both time and relationships.

Other criteria may also demonstrate a relationship, such as a common or similar IP address: For example, a network connection from IP address A to IP address B, or user C becomes friends with user D, or a research paper E cites research paper F. For example, a table of incident elements (Table I) illustrates an implicit graph of 192.168.10.2<-192.168.10.1->192.168.10.3->192.168.10.4->192.168.10.5 all with a "TCP connection" relationship, but not necessarily identifying a relationship between two IPs because they occurred in the log at the same time:

TABLE I

| TIMESTAMP | SOURCE IP PORT | TARGET IP TARGET PORT, PROTOCOL | |
|---|---|---|---|
| 2021 Jul. 21 11:43:21, | 192.168.10.1, 80, | 192.168.10.2, 80, | tcp |
| 2021 Jul. 21 11:43:23, | 192.168.10.1, 80, | 192.168.10.3, 80, | tcp |
| 2021 Jul. 21 14:14:01, | 192.168.10.3, 80, | 192.168.10.4, 80, | tcp |
| 2021 Jul. 21 14:36:57, | 192.168.10.4, 80, | 192.168.10.5, 80, | tcp |

Figure 2:
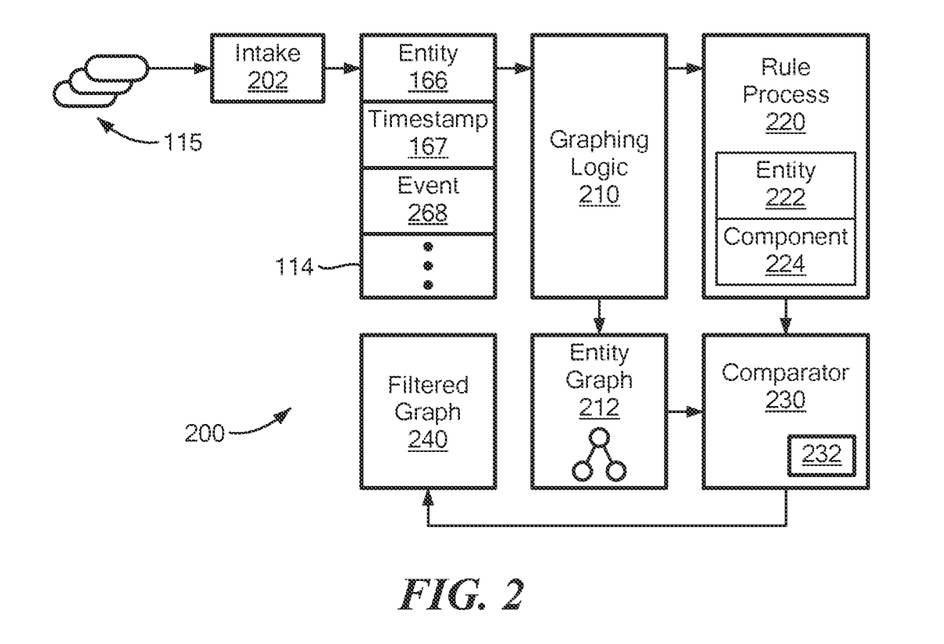
FIG. 2 is a data flow diagram for received incident reports in the environment of FIG. 1.

FIG. 2 is a data flow diagram 200 for received incident elements in the environment of FIG. 1. Referring to FIG. 2, the incident elements emanate as a stream, collection or report 115 from the network 112 via an intake 202 process and/or interface. Each incident element 114 includes at least an identification of an entity 166, a timestamp 167 and an event 268 denoted by the indicator dots 168. The temporal associations defined by the connectors 170 are based on timestamps defined by each.

Graphing logic 210 creates the rendering 160 from the plurality of incident reports 114 by displaying the bars 165 corresponding to each entity 166, indicator dots 168 for denoting events reported by the incident elements 114, and connectors 170 to define the relationships between the entities 166 from the connector bars 170 between the entities 166 defined by the relationship. The rendering 160 defines an entity graph 212 that includes the nodes for the entities 166 and the edges defining the relationships.

The incident elements 114 are also received by the rule processes 220, which include entity rules 222 and component rules 224, each which computes a score for each respective entity and component. A comparator 230 uses the entity graph 212 to compare the scores to a threshold 232 for determining which entries 164 pass through to the filtered graph 240 for generating the summary report 160'.

For processing an incoming stream 155 of the incident elements, the rule process 220 define one or more entity rules 222, discussed further below, for computing an entity score indicative of the relative importance. The rule process 220 also defines one or more component rules for computing the component score indicative of the relative importance. The comparator 230 compares, for each entity 166, the importance threshold 232 to the entity score based on the defined rules. It then compares, for each component, the importance threshold to the component score based on the defined rules. The filtered graph 240 then shows an indication of the entities having an entity score greater than the importance threshold, or that are included in a component having a component score greater than the importance threshold. Other entities 165 are removed from the report during the transition from the rendering 160 to the filtered report 160,' thus providing a more refined, pointed indication of the incidents of highest significance.

In particular arrangements, the importance threshold may be bifurcated into an entity importance threshold for comparison with the entity score, and a component importance threshold for comparison with the component score. There may also be a user interface that receives a value for defining the entity importance threshold and the component importance threshold, such as a slider or button for selection from a range of values. Briefly, the scores are normalized to a scale, such as between 0.0-1.0, so that the thresholds may be selected between 0 and 1 for say, 0.8 to gather the entity scores for which at least 80% achieved the threshold of important incidents.

The threshold therefore identifies a degree of elimination of a subset of the entities to generate a report with only the most significant entities remaining. Selection of the threshold may be tedious to identify a salient value to hone the "pruning" of less significant entities. Statistical analysis on past results to engage in machine learning based on a preferred threshold setting recognized for users. The machine learning can provide a threshold predicated to provide best results, such as maximizing the number of malicious servers that appear in the summary. In other words, perhaps previous users find that a 0.50 (50%) threshold still left a verbose report, but 90% eliminated too many. Successive iterations may demonstrate that 75% was an often-selected threshold. This may also provide suggested weighting of individual criteria for computing the scores.

Figure 3:
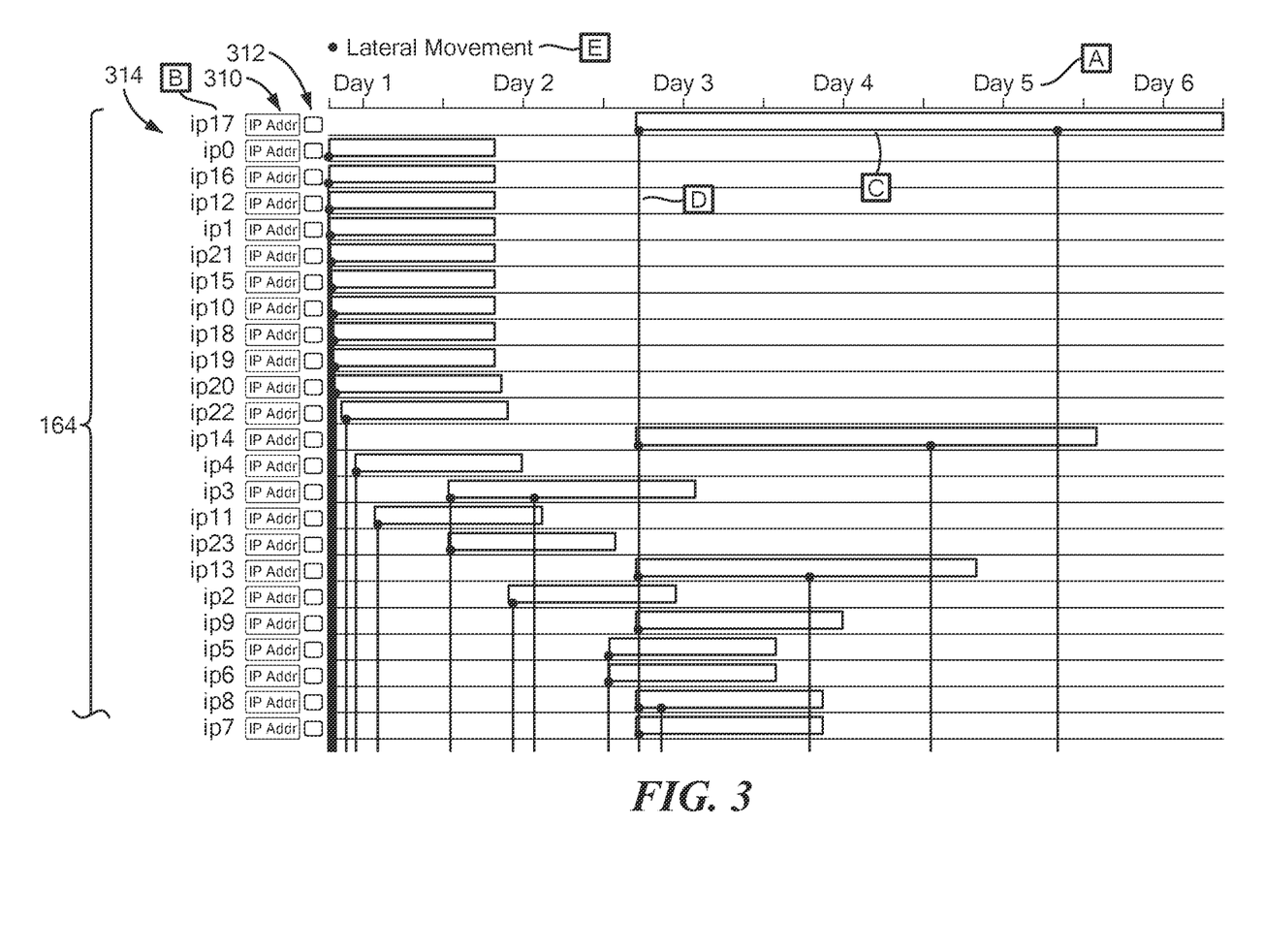
FIG. 3 is a rendering of an initial graph and a filtered graph based on the importance threshold as in FIG. 2.

FIG. 3 is a rendering of an initial graph 360 and a filtered graph 360' (visualizations) based on the importance threshold as in FIG. 2. Referring to FIGS. 1A-3, when a rendering 360 of an incident report is called for, the server 101 processes the incident report as a graph, where entities 166 are vertices and relationships are edges as defined by connectors 170. Next the system identifies all connected components, identifies all timestamps associated with each entity, and checks which (if any) relationship types map to an external framework.

Referring to FIG. 3, at the top of the visualization is a timescale [A] that indicates the first and last observed timestamps in the incident report. Each entity is assigned an entry 164, shown as a row [B], in the visualization. Each entry 164 includes the entity 166 name 314 (such as the value of the IP address), an icon 310 representing the type of entity, a checkbox 312 to select the entity, and a horizontal gray bar [C] that indicates the duration of time when activity was recorded for that entity.

Entities are ordered first by connected component, meaning nodes which are directly or indirectly connected by a path of edges, and which are ordered by the earliest timestamp for any entity in the connected component. Within connected components, entities are ordered by entity type, where IP addresses occur first, then hosts, then user accounts, then all other entities. Within entity type, entities are ordered so that earlier entities with longer durations are at the top.

If there is a relationship that connects two entities, the graphing logic 210 draws a vertical line as a connector 170 between the two entity rows, FIG. 3, [D]. The system places the connector 170 to align with the timescale for the timestamp when the relationship was logged. If the relationship represents a TTP from an external framework, then it may be colored depending on a severity denoted by the framework, otherwise the connector color is a neutral gray. An encoding at the top of the visualization [E] may map colors to relationship types. Showing the relationships with the entity durations is meant to address the activity progression goal while also illustrating any temporal or relational patterns. This visual design can provide a more succinct visual representation of a story than a table because each entity is a row, whereas typically a table has one row for each relationship or timestamp. This means that incident reports that have more relationships or timestamps than entities will be longer than this incident report visualization. This provides a consistency to all incident reports, regardless of a generation source.

Figure 4:
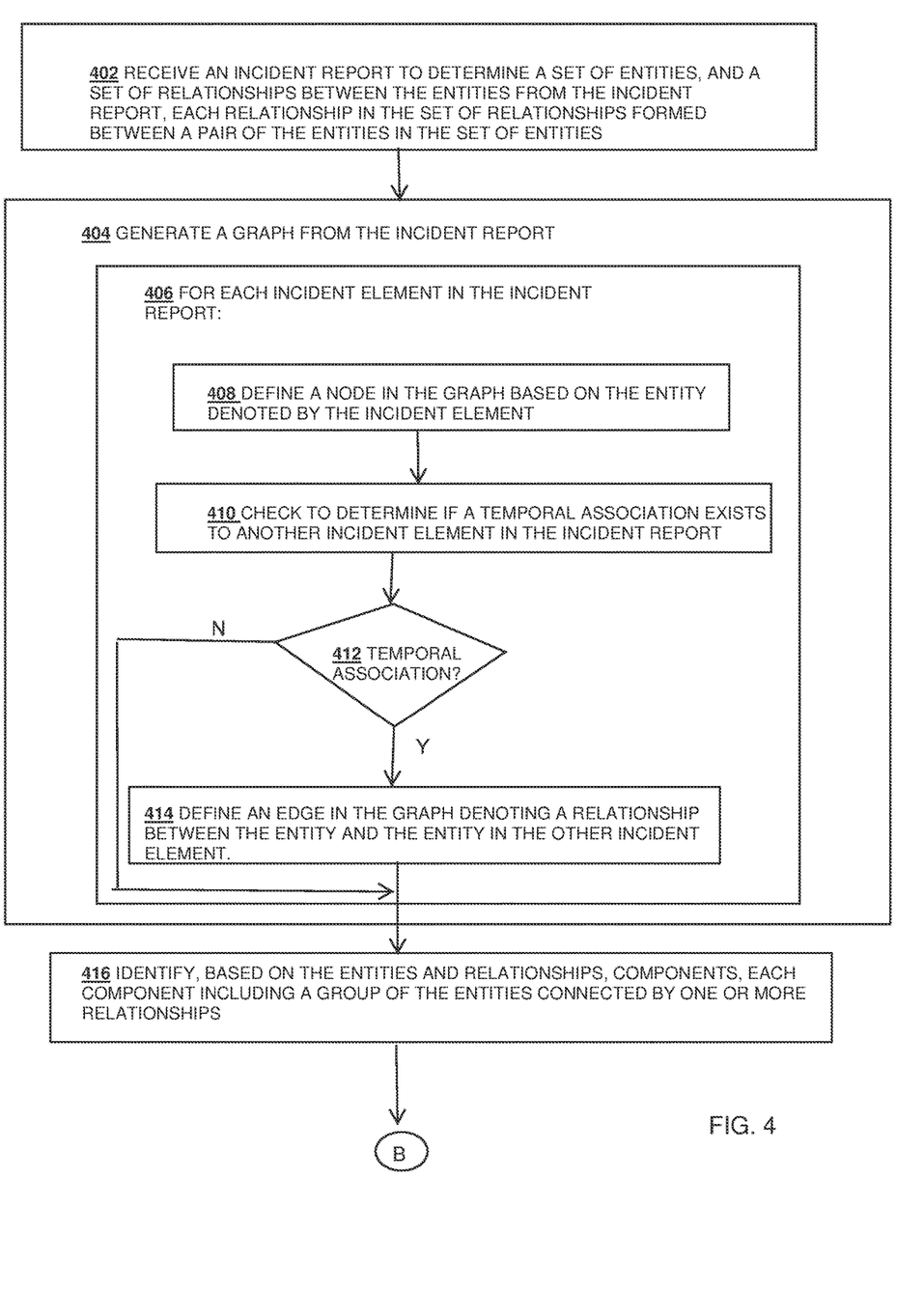
FIG. 4 is a flowchart of incident report summarization and visualization as in FIGS. 1-3.

FIG. 4 is a flowchart of incident report summarization and visualization as in FIGS. 1-3. A simplified narrative such as the filtered renderings 160' 360' can be particularly useful in cyber security logs and incidents reports for orienting analysts to the relationships between the main victims and attackers, or for presenting the core sequence of events to an organization's leadership or stakeholders. In practical exposure, cyber security analysts often have limited time to explore data, so it is therefore beneficial to provide a summary of the incident report narrative to help avoid spending unnecessary time analyzing incident reports that may not turn out to be important.

The narrative summarization method for the temporal entity relationship graphs as described above has several general aspects:
  1. Specify a summarization threshold $t \in [0,1]$.
  2. Calculate a set of scores for each entity e using several criteria, and another set of scores for each connected component C using another set of criteria.

3. Average the scores for each entity and for each component.
4. Remove entities whose average score or whose component's average score is below the summarization threshold.
5. Remove all relationships where either the source or the target entity was removed.

A particular feature is the use of components in addition to entities in evaluating the importance scores for the entities called out in the incidents. By accumulating not only a score about individual entities, but also components of connected entities based on the graph, individual entities are given proper weight and those that are part of a larger scenario are given proper weight. Similarly, entities that occur frequently but have less significance are not overemphasized. Various summarization approaches may be employed to define a degree of abridgement in removal of the entities or entries deemed less pertinent. For example, another embodiment may remove entities whose average score and whose component's average score is below the summarization threshold. Or in another embodiment, remove entities where the average of their entity and component scores together is below the summarization threshold.

Referring to FIG. 4, and continuing to refer to FIGS. 1A-3, in an incident report 115 of events occurring in a networked environment, a method of computing and reporting the most significant events includes, at step 402, receiving an incident report for determining a set of entities, and a set of relationships between the entities from the stream of incident reports. Each relationship in the set of relationships is formed between a pair of the entities in the set of entities.

A graph is generated from the stream of incident reports, as depicted at step 404. For each incident element in the incident report (step 406), the server 101 defines a node in the graph based on the entity 166 denoted by the incident element 114, as shown at step 408. The graphing logic 210 determines if a temporal association exists to another incident element in the incident report, as depicted at step 410, and if a temporal association exists at step 412, an edge is defined in the graph denoting a relationship between the entity and the other entity in the incident element, as shown at step 414.

The server 101 identifies components, based on the entities and relationships, such that each component includes a group of the entities connected by one or more relationships, as defined at step 416. In general, the server 101 evaluates the entities and components based on a congruity or commonality of the relationships for computing a significance of the entities relative to the other entities, such that the evaluation of a component augments the computed significance of the entities included in the component. Such congruity may be temporal, as in events that occurred around the same time, or based on the same/similar IP addresses, or other grouping of the relationships collectively occurring between a set of entities defining the component.

The entity and component scores may be determined by any suitable approach to generate entity and component scores as defined herein. In the example configuration, a set of scores S (e) is created for each entity e in the set of entities E using a set of criteria described below. Each criteria results in an associated score for an entity, unless the score is undefined for the entity.

As a preprocessing step, identify all connected components, i.e. all groups of entities (vertices) where a set of relationships (edges) connect each pair of entities in the group. Additionally, for each connected component, identify the entity with the earliest timestamp, the entity with the latest timestamp, and conduct a depth first search to find all relationship paths from the earliest entity to the latest entity. In another embodiment, the depth first search could traverse the children of each entity (vertex) from highest degree (most relationships) to lowest degree (fewest relationships). This defines a core events sequence (if a component has only one entity then that entity is trivially the core sequence of events for that component). The core sequence is one of several factors considered in quantitative scoring of entities, discussed further below.

The scoring criteria includes the entity criteria 222 and the component criteria 224, which are applied sequentially.

At step 418, for each entity, apply the entity rules to the entity, in which the entity rules include one or more criteria for evaluating the entity based on the stream of incident reports, as depicted at step 420. A score is computed for each of the criteria satisfied by the entity, as disclosed at step 422, and a set of scores accumulated based on the respective criteria satisfied by the entity at step 424. The server 101 will determine the entity score based on the set of scores, as depicted at step 426.

Applying the criteria included in the entity rules further includes adding a score to the set of scores if the entity is included in a traversal path defined by relationships from an entity corresponding to a timestamp of an earliest incident report to an entity corresponding to a timestamp of a latest incident report, defining the core sequence. The first criteria is for entities in the core sequence of events that belong to components with more than one entity. This criteria adds a score of 1 to the entity's set of scores S(e); no score is added for all other entities.

The core sequence in the graph is therefore determined by determining the entity corresponding to the earliest timestamp from among the incident reports, and determining the entity corresponding to the latest timestamp from among the incident reports. A traversal of the graph identifies entities corresponding to nodes in a traversal path from the earliest timestamp to the latest timestamp, and the core event sequence is defined including the entities corresponding to the path and increasing the score for each of each entity corresponding to the nodes in the traversal path.

A score is also added to the set of scores based on a duration defined by entities included in a component based on a duration of time spanned by the component, and finally adding a score to the set of scores based on a duration of time spanned by the component relative to a duration spanned by the traversal path.

In further detail, computations performed in an example arrangement include, for a given connected component C, inducing subgraphs from the set of entities that are not part of the core sequence of events. Each connected component C' in the induced subgraphs can be thought of as a "branch" from the core sequence of events. Several scores are calculated for the entities in C'. Compute:

$$\frac{\text{latest timestamp in } C' - \text{earliest timestamp in } C'}{\text{duration of } C}$$

And add it to S(e) for all e in C'. This gives an indication of how much of the overall time an entity has activity.

$$\frac{\text{latest timestamp in } C' - \text{earliest timestamp in } C'}{\text{duration of the core sequence of events}}$$

Gives an indication relative to the core sequence of events.

For external criteria, a severity is also calculated based on the relative severity within the range afforded by the external criteria.

Scores may also be added to the set of scores based on a comparison of the relationship between the entities corresponding to a predetermined ranking of relationship types. The ranking of relationship types is indicative of a likelihood of adverse results occurring from the respective relationship type.

Component scores are also computed. At step 428, for each component; applying the component rules to the component, in which the component rules include one or more criteria for evaluating the component based on the stream of incident reports, as depicted at step 430. Accumulate a set of scores based on each respective criteria satisfied by the component at step 432, and determine the component score based on the set of scores, as depicted at step 434.

As with the entity scores, a variety of scoring criteria may be applied. In the example configuration, the criteria included in the component rules further comprises the following. For each component, $$\frac{\text{the duration of } C}{\text{the longest duration of all components}}$$

adds a score to the set of scores based on a duration defined by a respective component relative to a duration of the component having the longest duration.

$$\frac{\text{the number of entities in } C}{\text{the number of entities in the largest component}}$$

adds a score to the set of scores based on a number of entities included in the component relative to a number of entities included in the component having the most entities.

$$\frac{\text{the number of relationships in } C}{\text{the largest number of relationships in all components}}$$

adds a score to the set of scores based on number of relationships among the entities included in the component relative to the number of relationships in the component having the largest number of relationships; and $$\frac{\text{the number of timestamps in } C}{\text{the largest number of timestamps in all components}}$$

adds a score to the set of scores based on the number of timestamps pertaining to entities included in the component.

Alternate criteria may add a score to the set of scores based on an aggregation of types of relationships between the entities included in the component in comparison to a predetermined ranking of relationship types.

Once the individual entity scores (set of scores) and component scores (set of scores) are computed, the server computes, for each entity and each component, a score indicative of a significance of the entity or component, as depicted at step 436.

This includes computing the entity score based on an assimilation of a set of scores based on the entity rules, as depicted at step 438, and computing the component score based on assimilation of a set of scores based on the component rules, as depicted at step 440. Based on the initial rendering 160, 360, an entity is removed if either $$t > \sum_{s \in S(e)} \frac{s}{|S(e)|}$$

or $$t > \sum_{s \in S(C)} \frac{s}{|S(C)|}$$

Thus normalizing the entity score and the component score for comparison with the importance threshold, as depicted at step 442.

Once all entity and component scores are summed as above, the server 101 evaluates, whether the entities and components having a score greater than the importance threshold, as depicted at step 444. This includes comparing the entity score to the importance threshold, as shown at step 446. If the entity score exceeds the importance threshold, the entity is passed to the filtered report 160', 360'. Otherwise, if the entity is included in a component having a score that exceed the importance threshold, the entity passes to the filtered report, as shown in the check at step 450. This makes it more likely that entities included in components of high significance do not elude the filtered report.

Step 450 compares the component score to which the entity belongs to the importance threshold. Rather than an additive quantity, the sores are normalized to a standard range [0 . . . 1], and then the aggregate sum is divided by the number of elements, effectively averaging both the entity and component scores. During the accumulation process above, a larger number of values equal to or close to 1 has a tendency to weight the score towards 1, similarly a number of near zero values pulls the overall score lower, making it less likely to exceed the importance threshold and pass to the filtered view. If the entity does not have either an entity or component score that exceeds the importance threshold, it is excluded at step 452, otherwise it advances to the summary rendering 160', 360' at step 545.

An enhancement to pure averaging of the scores may provide that each of the various criteria used to come up with an average score can be weighted. So, for example, if an entity gets scores of 1, 0.7, 0.8, 1, and 1, perhaps instead of each score county 20% of the average, they count 30%, 10%, 20%, 15% and 25% and therefore instead of a score of (1+0.7+0.8+1+1)/5=0.9 it received a score of ((1*0.30)+(0.7*0.1)+(0.8*0.2)+(1*0.15)+(1*0.25))=0.93.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a stream of reported events defined by incident reports of network entities in a computer network, a method of reporting the most significant events, comprising:

receiving the stream of incident reports at a computer having a memory, each incident report depicting an entity in the network, the entities including at least one of device addresses, hosts and user accounts in the computer network;

determining a set of the entities, and a set of relationships between the entities, from the stream of incident reports, each relationship in the set of relationships formed between a pair of the entities in the set of entities;

identifying, based on the entities and relationships, components, each component including a group of the entities connected by one or more relationships;

evaluating the entities and components based on a congruity of the relationships for computing a significance of the entities relative to the other entities, the evaluation of a component augmenting the computed significance of the entities included in the component, evaluating including generating a graph from the stream of incident reports, further comprising:

for each incident report in the stream of incident reports:

defining a node in the graph based on the entity denoted by the incident report;

determining if a temporal association exists to another incident report in the stream of incident reports; and if so, defining an edge in the graph denoting a relationship between the entity and the entity in the other incident report; and rendering, based on an importance threshold, an indication of the entities having the greatest computed significance displayed on a screen entry for each respective entity, the temporal associations based on timestamps defined by each incident report in the stream of incident reports, further comprising:

determining the entity corresponding to the earliest timestamp from among the incident reports;

determining the entity corresponding to the latest timestamp from among the incident reports;

traversing the graph to identify entities corresponding to nodes in a traversal path from the earliest timestamp to the latest timestamp; and defining a core event sequence including the entities corresponding to the path and increasing the score for each entity corresponding to the nodes in the traversal path.

2. The method of claim 1 further comprising:
rendering, for each incident report, an indication of the type of incident and an indication of the time of the incident on the entry corresponding to the entity to which the incident pertains.

3. In a stream of reported events defined by incident reports of network entities in a computer network, a method of reporting the most significant events, comprising:
receiving the stream of incident reports at a computer having a memory, each incident report depicting an entity in the network, the entities including at least one of device addresses, hosts and user accounts in the computer network;

determining a set of the entities, and a set of relationships between the entities, from the stream of incident reports, each relationship in the set of relationships formed between a pair of the entities in the set of entities;

identifying, based on the entities and relationships, components, each component including a group of the entities connected by one or more relationships;

evaluating the entities and components based on a congruity of the relationships for computing a significance of the entities relative to the other entities, the evaluation of a component augmenting the computed significance of the entities included in the component, evaluating further comprising:

computing, for each entity and each component, a score indicative of a significance of the entity or component, the score based on the relationships; and evaluating, based on an importance threshold, the entities and components having a respective entity score or component score greater than the importance threshold; and rendering, based on an importance threshold, an indication of the entities having the greatest computed significance displayed on a screen entry for each respective entity; further comprising:

defining one or more entity rules for computing the entity score indicative of the importance;

defining one or more component rules for computing the component score indicative of the importance;

comparing, for each entity, the importance threshold to the entity score based on the defined rules; and comparing, for each component, the importance threshold to the component score based on the defined rules; and rendering an indication of the entities having an entity score greater than the importance threshold or included in a component having a component score greater than the importance threshold.

4. The method of claim 3 further comprising:
for each entity,
applying the entity rules to the entity, the entity rules including one or more criteria for evaluating the entity based on the stream of incident reports;
computing a score for each of the criteria satisfied by the entity;
accumulating a set of scores based on the respective criteria satisfied by the entity; and
determining the entity score based on the set of scores.

5. The method of claim 4 further comprising:
identifying a weight applicable to each of the one or more criteria for evaluating the entity; and
adjusting a respective score in the set of scores based on the weight applicable to the corresponding criteria.

6. The method of claim 4 wherein applying the criteria included in the entity rules further comprises:
adding a score to the set of scores if the entity is included in a traversal path defined by relationships from an entity corresponding to a timestamp of an earliest incident report to an entity corresponding to a timestamp of a latest incident report;
adding a score to the set of scores based on a duration defined by entities included in a component based on a duration of time spanned by the component; and
adding a score to the set of scores based on a duration of time spanned by the component relative to a duration spanned by the traversal path.

7. The method of claim 6 further comprising:
adding a score to the set of scores based on a comparison of the relationship between the entities corresponding to a predetermined ranking of relationship types, the ranking of relationship types indicative of a likelihood of adverse results occurring from the respective relationship type.

8. The method of claim 3 further comprising:
for each component;
applying the component rules to the component, the component rules including one or more criteria for evaluating the component based on the stream of incident reports;
accumulating a set of scores based on each respective criteria satisfied by the component and
determining the component score based on the set of scores.

9. The method of claim 8 wherein applying the criteria included in the component rules further comprises:
adding a score to the set of scores based on a duration defined by a respective component relative to a duration of the component having the longest duration;
adding a score to the set of scores based on a number of entities included in the component relative to a number of entities included in the component having the most entities;
adding a score to the set of scores based on number of relationships among the entities included in the component relative to the number of relationships in the component having the largest number of relationships; and
adding a score to the set of scores based on the number of timestamps pertaining to entities included in the component.

10. The method of claim 9 further comprising:
adding a score to the set of scores based on an aggregation of types of relationships between the entities included in the component in comparison to a predetermined ranking of relationship types.

11. The method of claim 8 further comprising:
identifying a weight applicable to each of the one or more criteria for which the set of scores is accumulated; and
determining the component score based on the respective criteria and the corresponding weight.

12. The method of claim 3 further comprising:
computing the entity score based on an assimilation of a set of scores based on the entity rules;
computing the component score based on assimilation of a set of scores based on the component rules;
normalizing the entity score and the component score for comparison with the importance threshold.

13. The method of claim 12 further wherein the importance threshold further comprises:
an entity importance threshold for comparison with the entity score; and
a component importance threshold for comparison with the component score;
further comprising receiving a value from a user interface for defining the entity importance threshold and the component importance threshold.

14. The method of claim 3, further comprising:
aggregating the importance threshold for a plurality of iterations for evaluating the entities and components;
identifying a quantity of the entities and components evaluated as within the importance threshold; and
defining the importance threshold based on the importance threshold and quantity of previous iterations of the plurality of iterations.

15. A computer program embodying program code on a non-transitory medium that, when executed by a processor, performs steps for implementing a method of computing and reporting the most significant events in a stream of reported events defined by incident reports of network entities in a computer network, the method comprising:
receiving the stream of incident reports at a computer having a memory, each incident report depicting an entity in the network, the entities including at least one of device addresses, hosts and user accounts in the computer network;
determining a set of the entities, and a set of relationships between the entities, from the stream of incident reports, each relationship in the set of relationships formed between a pair of the entities in the set of entities;
identifying, based on the entities and relationships, components, each component including a group of the entities connected by one or more relationships;
evaluating the entities and components based on a congruity of the relationships for computing a significance of the entities relative to the other entities, the evaluation of a component augmenting the computed significance of the entities included in the component, evaluating including generating a graph from the stream of incident reports, further comprising:
for each incident report in the stream of incident reports:
defining a node in the graph based on the entity denoted by the incident report;
determining if a temporal association exists to another incident report in the stream of incident report; and if so,
defining an edge in the graph denoting a relationship between the entity and the entity in the other incident report; and
rendering, based on an importance threshold, an indication of the entities having the greatest computed significance;
receiving the stream of incident reports as a sequence of event messages from one or more processes for gathering network security events, each incident report defining an entity and a timestamp;
arranging the incident reports as a rendering defined by an entity axis including an entry displayed on a screen entry for each for each respective entity and a time axis indicating a commencement and a duration of activity corresponding to each respective entity;
rendering each of the relationships as a connector between the entities defined by the respective relationship; and
rendering a filtered set based on a subset of the entries having the greatest computed significance.

16. The method of claim 15 further comprising:
rendering, for each incident report, an indication of the type of incident and an indication of the time of the incident on the entry corresponding to the entity to which the incident pertains.

* * * * *